United States Patent
Wood et al.

(10) Patent No.: US 6,178,063 B1
(45) Date of Patent: Jan. 23, 2001

(54) STATICALLY AND DYNAMICALLY BALANCING A THREE-DISC DISC STACK ASSEMBLY

(75) Inventors: Roy L. Wood, Yukon; John D. Stricklin, Oklahoma City, both of OK (US)

(73) Assignee: Seagate Technology LLC, Scotts Valley, CA (US)

(*) Notice: Under 35 U.S.C. 154(b), the term of this patent shall be extended for 0 days.

(21) Appl. No.: 09/326,091

(22) Filed: Jun. 4, 1999

Related U.S. Application Data
(60) Provisional application No. 60/088,056, filed on Jun. 5, 1998.

(51) Int. Cl.⁷ .......................... G11B 17/038; G11B 25/04
(52) U.S. Cl. .................................. 360/98.08; 360/98.07; 73/461
(58) Field of Search ............................. 360/98.07, 98.08, 360/99.08; 29/603.03; 73/461

(56) References Cited

U.S. PATENT DOCUMENTS

| | | |
|---|---|---|
| 3,854,347 | 12/1974 | Hellerich . |
| 4,683,505 | 7/1987 | Schmidt et al. . |
| 4,951,526 | 8/1990 | Linder . |
| 5,074,723 | 12/1991 | Massa et al. . |
| 5,130,870 | 7/1992 | Jabbari . |
| 5,136,450 | 8/1992 | Moir . |
| 5,249,090 | 9/1993 | Fehse . |
| 5,367,418 | 11/1994 | Chessman et al. . |
| 5,422,776 | 6/1995 | Thorson et al. . |
| 5,436,775 | 7/1995 | Ishimatsu . |
| 5,537,272 | * 7/1996 | Kazmierczak et al. ........... 360/99.08 |
| 5,555,144 | 9/1996 | Wood et al. . |
| 5,572,382 | 11/1996 | Kuno . |
| 5,621,588 | * 4/1997 | Williams et al. ................. 360/98.07 |
| 5,811,678 | 9/1998 | Hirano . |
| 5,828,518 | 10/1998 | Moir et al. . |

FOREIGN PATENT DOCUMENTS
5-159508 * 6/1993 (JP) .

OTHER PUBLICATIONS
IBM TDB "Disk Stack Imbalance Improvement" Dec. 1, 1995, vol. 38, issue 12 pp. 79–80.*

* cited by examiner

*Primary Examiner*—William Klimowicz
(74) *Attorney, Agent, or Firm*—Crowe & Dunlevy (57) ABSTRACT

Apparatus and method for providing static and dynamic balance in a disc drive having three recording discs. A spindle motor hub includes an outer surface which circumferentially extends about a central axis at an outer radius less than a disc inner radius. A groove is formed in the hub to provide a groove inner surface having a groove radius less than the hub outer radius. The groove radius is selected to be twice the hub outer radius minus the disc inner radius. First and third discs are loaded onto the hub and shifted to bring respective disc inner surfaces into abutment with the hub outer surface at a first angular location. The second, intermediate disc is loaded onto the hub and shifted to bring the disc inner surface into abutment with the groove inner surface at a second angular location opposite the first angular location.

10 Claims, 5 Drawing Sheets

STATICALLY AND DYNAMICALLY BALANCING A THREE-DISC DISC STACK ASSEMBLY

RELATED APPLICATIONS

This application claims the benefit of U.S. Provisional Application No. 60/088,056 filed Jun. 5, 1998.

FIELD OF THE INVENTION

This invention relates generally to the field of hard disc drive data storage devices and more particularly, but not by way of limitation, to a method and apparatus for achieving static and dynamic balance in a disc pack assembly having a total of three recording discs.

BACKGROUND OF THE INVENTION

Modern hard disc drives comprise one or more rigid discs that are coated with a magnetizable medium and mounted on the hub of a spindle motor for rotation at a constant, high speed. Data are stored on the discs in a plurality of concentric circular tracks by an array of transducers ("heads") mounted to a radial actuator for movement of the heads relative to the discs.

A voice coil motor (VCM) is used to position the heads with respect to the disc surfaces. The heads are mounted via flexures at the ends of a plurality of arms which project radially outward from an actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The VCM includes a coil mounted on the side of the actuator body opposite the head arms so as to be immersed in the magnetic field of a magnetic circuit comprising one or more permanent magnets and magnetically permeable pole pieces. When current is applied to the coil, an electromagnetic field is set up which interacts with the magnetic field of the magnetic circuit to cause the coil to move relative to the permanent magnets, causing the actuator body to pivot about the pivot shaft and move the heads across the disc surfaces.

Typically, the plurality of open-centered discs and a plurality of spacer rings are alternately stacked on the hub of a spindle motor. The hub, defining the core of the stack, serves to align the discs and spacer rings around the common centerline. Movement of the discs and spacer rings is typically constrained by placing the stack under a compressive load and maintaining the load by means of a clamp ring. Collectively, the discs, spacer rings, clamp ring and spindle motor hub define a disc pack assembly or disc pack.

The discs must be clamped to the hub arrangement with sufficient force to reliably prevent radial movement of the disc pack, which could result from unbalanced torsional forces, thermal expansion or sudden load changes during transportation. Moreover, when the discs are not aligned perfectly concentric with the hub to provide a balanced disc pack assembly, the discs can vibrate during rotation and cause errors in track following as well as create excessive noise. In particular, increasing demands for high-performance, large capacity disc drives have lead to increased disc rotational speeds. At such high rotational speeds, improper balancing of the disc pack about the spindle motor can cause excessive bearing wear, eccentricity resulting in the reading or writing on adjacent concentric tracks on the disc surfaces, and surface runout that may result in "head crashes" and the consequent damage of both the heads and the magnetic medium on the disc surfaces. Unbalance can also set up undesirable vibrations which can be transmitted to system cabinets, creating annoying acoustic noise as well as providing undesirable vibrational inputs to adjacently mounted disc drives.

The condition of unbalance of a disc pack assembly can be classified as static and dynamic unbalance (also sometimes referred to as static imbalance and dynamic, or coupled, imbalance). In the case of static unbalance, the unbalance force appears in a single axis plane and in the same direction as the unbalance mass. Such unbalance can cause translational displacement of the discs during rotation as the normal circular rotation of the discs becomes exaggerated. As will be recognized, the disc pack assembly is at least in principle, cylindrically symmetrical with respect to the rotation axis of the assembly; i.e., the axis of the hub. Consequently, in principle, the center of mass of the assembly will be located on the rotation axis and the assembly will be statically balanced for rotation on the disc drive. However, factors such as small variations in disc thickness, discs that are not perfectly circular, central mounting apertures that are not perfectly concentric with the outer edges of the discs, and central mounting aperatures not concentric with the axis of rotation, can all contribute to static unbalance of the disc.

In the case of dynamic unbalance, the unbalance forces can be in a single axial plane and on opposite sides of the rotational axis, or in two different axial planes. During rotation, the two unbalance forces form a couple, which has a tendency to rock or tilt the axis of rotation, causing the dynamically unbalanced discs to slightly tilt as they rotate. Dynamic balance is achieved when the axis about which the discs are forced to rotate is parallel with a principle axis of inertia so that no products of inertia about the center of gravity of the body exist in relation to the selected rotational axis.

Prior art attempts to provide solutions for balancing disc pack assemblies, however, do not provide adequate remedies. For example, one approach involves placing pieces of adhesive backed lead foil in strategic locations on the assembly. One problem with this approach is that aging of the adhesive after extended operation of the disc drive could cause the foil to detach from the assembly. Moreover, the adhesive forms a source of large organic molecules which can accumulate on the heads and thereby impede head performance.

Another prior art approach involves drilling a series of symmetrically spaced holes in one end of the hub, tapping the holes, and setting screws of various lengths mounted in the holes to effect the final balance. However, such a method results in increased time and cost in manufacturing and installing the holes and screws. Moreover, the tapped holes can trap particulate matter that can later be dislodged and adhere to disc surfaces as surface flaws which impede the flight of heads over such surfaces.

In a third prior art approach, a plurality of discs are fixed to a spindle motor in a manner such that they are alternately shifted about the spindle motor so that their respective inner circumferential edges abut against the outer circumferential surface of the spindle motor hub at different angular locations. Generally, for an even number of discs, half of the discs can be shifted in one direction and the remaining number of discs can be shifted in the diametrical direction (i.e., 180 degrees out). For an odd number of discs, the discs can be angularly offset around the spindle motor hub at evenly spaced intervals (such as every 72 degrees for a disc pack having a total of five discs).

However, while such methodologies can generally achieve nominal static and dynamic balance for disc packs having four or more discs, a disc pack having only three discs presents particular difficulties. For example, angularly offsetting the three discs 120 degrees apart will often nominally achieve static balance, but not dynamic balance.

A continuing trend in the industry is to provide ever greater data recording densities and data transfer rates in successive generations of drives. As discs are among the highest cost components in a disc drive, there is a significant economic benefit to a disc drive manufacturer to be able to achieve a given data storage capacity with a reduced number of discs.

Thus, notwithstanding the balancing problems associated with three-disc configurations, manufacturers are increasingly developing disc drive products utilizing three discs. There is a need, therefore, for an effective and efficient approach to achieving both static and dynamic balancing of a three-disc disc pack.

SUMMARY OF THE INVENTION

The present invention provides an apparatus and method for providing nominal static and dynamic balance in a disc drive having three rotatable recording discs.

In accordance with preferred embodiments, a disc drive spindle motor hub is operably configured to rotate a set of three discs about a central axis. The discs are nominally identical, each having a central opening with a disc inner surface at a disc inner radius.

The hub includes a hub outer surface which circumferentially extends about the central axis at a hub outer radius less than the disc inner radius. A groove is formed in the hub to provide a groove inner surface which radially extends about the central axis at a groove radius less than the hub outer radius. The groove radius is preferably selected to be two times the hub outer radius minus the disc inner radius.

To form a nominally statically and dynamically balanced disc pack assembly from the spindle motor hub and the discs (referred to as first, second and third discs, respectively), the first disc is loaded onto the spindle motor hub and shifted to bring the disc inner surface of the first disc into abutment with the hub outer surface at a first angular location (such as 0 degrees).

The second disc is next loaded onto the hub and shifted to bring the disc inner surface of the second disc into abutment with the groove inner surface at a second angular location (such as 180 degrees) opposite the first angular location. As with the first disc, the third disc is loaded onto the hub and shifted to bring the disc inner surface of the third disc into abutment with the hub outer surface at the first angular location (such as 0 degrees). Disc spacers are preferably loaded to provide inter-disc spacing between adjacent discs, and a disc clamp secures the discs to the hub in the desired configuration.

Static and dynamic balance are nominally achieved because shifting two discs a given distance in a first direction counters the effects of a single disc shifted twice the distance in the opposite direction.

These and various features as well as advantages which characterize the present invention will be apparent from a reading of the following detailed description and a review of the associated drawings.

DETAILED DESCRIPTION

Figure 1:
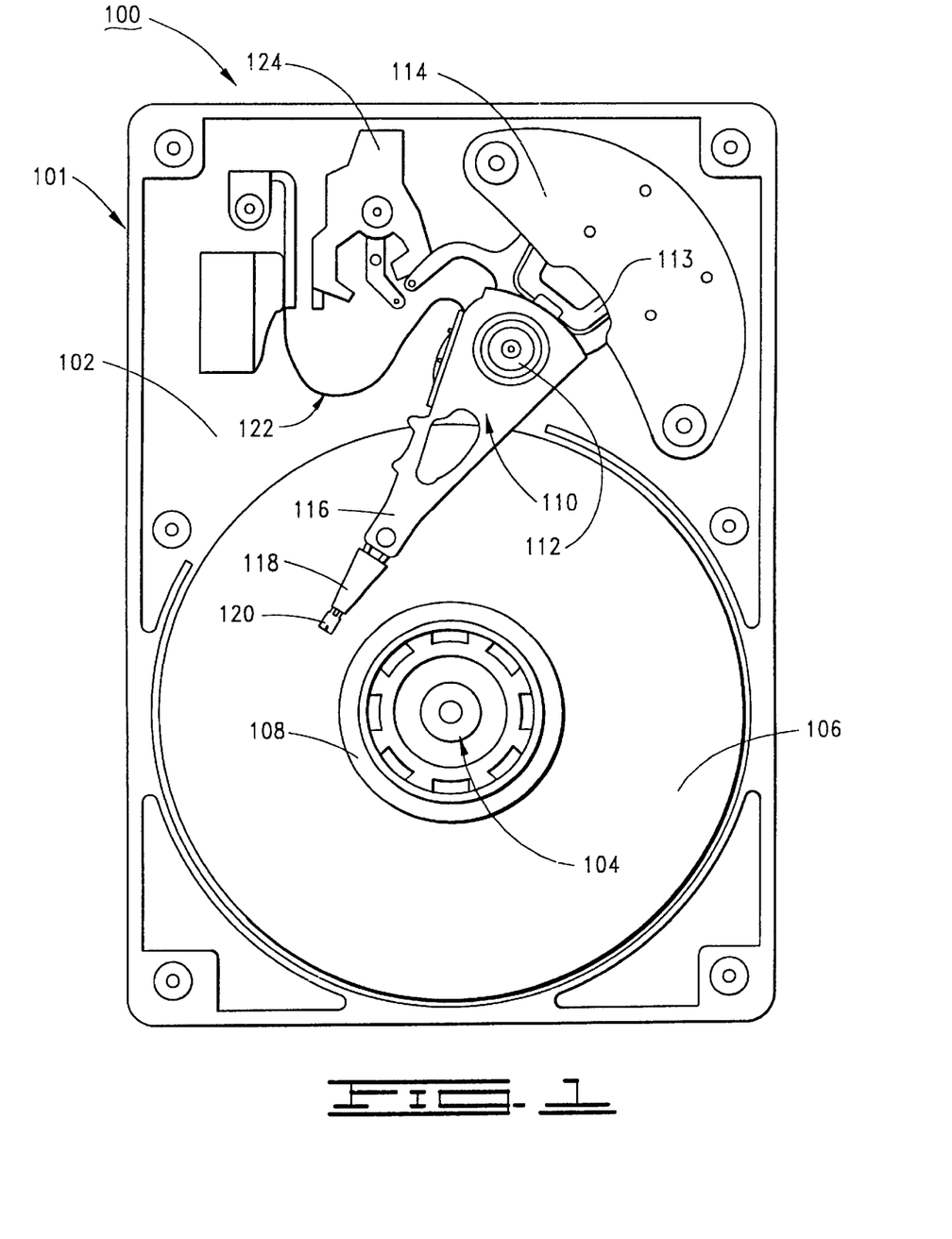
FIG. 1 provides a top plan view of a disc drive constructed in accordance with preferred embodiments of the present invention.

In order to set forth a detailed description of various presently preferred embodiments of the present invention, reference is first made to FIG. 1 which shows a top plan view of a disc drive 100 used to store computer data. The disc drive 100 includes a head-disc assembly (HDA) 101 and a printed wiring assembly (PWA) which is mounted to the underside of the HDA and thus, not visible in FIG. 1.

The HDA 101 includes a base deck 102 to which various disc drive components are mounted. A top cover, which has been omitted from FIG. 1 to facilitate the present discussion, cooperates with the base deck 102 to form an internal, sealed environment for the disc drive 100.

As discussed more fully below, a spindle motor 104 is provided with a rotatable hub (not separately designated) which rotates a total of three discs 106 at a constant high speed, with a disc clamp 108 securing the discs 106 to the spindle motor 104. Disc spacers (not visible in FIG. 1) provide inter-disc spacing between adjacent discs. The assembly formed from the spindle motor hub, discs 106 disc clamp 108 and disc spacers is collectively referred to herein as a "disc pack assembly," or a "disc pack."

To access the discs 106, a controllably positionable actuator assembly 110 is provided which rotates about a cartridge bearing assembly 112 in response to currents applied to a coil (a portion of which is shown at 113) of a voice coil motor (VCM) 114. The actuator assembly 110 includes a plurality of arms from which corresponding flexure assemblies extend, the topmost of which are identified at 116, 118 respectively. Heads 120 are provided at distal ends of the flexure assemblies 116, 118 and are supported over the discs 106 by air bearings established by air currents set up by the rotation of the discs 106.

A flex circuit assembly 122 provides electrical communication paths between the actuator assembly 110 and the disc drive PWA. A latch assembly 124 secures the heads 120 over texturized landing zones (not separately designated) near the innermost radii of the discs 106 when the disc drive 100 is deactivated.

Figure 2:
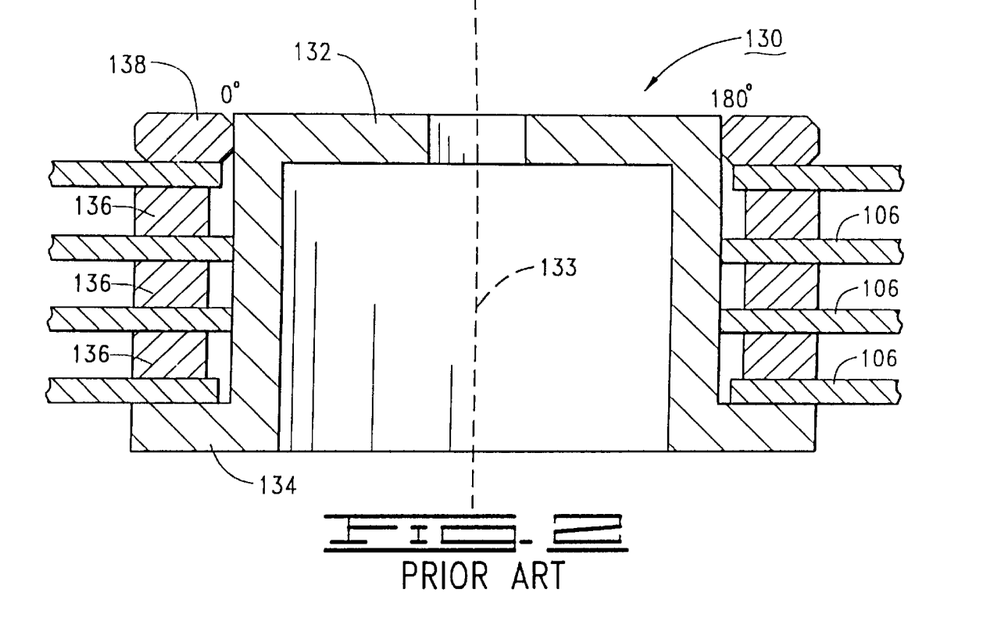
FIG. 2 is an elevational, cross-sectional view of a prior art disc drive spindle motor.

Referring to FIG. 2, shown therein is an elevational, cross-sectional view of portions of a prior art spindle motor 130. As interior portions of the spindle motor 130 are not germane to the present invention, such have been omitted from FIG. 2.

A rotatable hub 132 of the spindle motor 130 rotates about a central axis 133 and includes a radially extending disc support flange 134. A total of four discs 106 (nominally identical to the discs of FIG. 1) and three disc spacers 136 are arranged about an outer hub surface (not designated) to form a disc pack. As will be recognized, the disc pack is generally assembled by placing a first one of the discs 106 over the hub 132 and onto the disc support flange 134. Disc spacers 136 and discs 106 are alternately added until all of the discs 106 have been positioned, after which a disc clamp 138 is assembled to complete the disc pack. The disc clamp 138 applies an axially directed clamping force to maintain the discs 106 in a predetermined relation to the spindle motor hub 132.

In order to allow the discs 106 to pass onto the spindle motor hub 132, a central opening (not designated) of each of the discs is provided with a radius (hereinbelow referred to as the "disc inner radius") that is slightly greater than the radius of the hub 132. It will be noted from FIG. 2 that the topmost and bottommost discs 106 are shifted to the right with respect to the hub 132 and the two intermediate discs 106 are correspondingly shifted to the left with respect to the hub 132. For convenience, the angular location at which the topmost and bottommost discs 106 contact the spindle motor hub 132 has been identified as 0 degrees, and the angular location at which the two intermediate discs 106 contact the spindle motor hub 132 has been identified as 180 degrees.

The shifting of the discs as shown in FIG. 2 serves to reduce static unbalance in the spindle motor 130. As discussed above, static unbalance generally results in translational displacement of the discs during rotation along a plane normal to the rotational axis. The shifting of the discs 106 as set forth by FIG. 2, however, tends to place the center of mass on the central (rotational) axis 133, providing static balance for the disc pack.

The shifting of the discs also serves to reduce dynamic unbalance in the spindle motor 130. As discussed hereinabove, dynamic balance is achieved when the axis about which a disc is forced to rotate is parallel with a principle axis of inertia so that no products of inertia about the center of gravity of the disc pack exist in relation to the selected rotational axis. In the configuration of FIG. 2, the axis of inertia of the disc pack corresponds to the central (rotational) axis 133. Thus, the paired shifting of the discs reduces the presence of forces that would form a couple that would tend to act to rock or twist the disc pack about the central axis 133.

It will be noted that the spacers 136 can also be shifted as desired, but due to their smaller mass and proximity to the central axis, the spacers 136 do not generally have as great an effect upon the balancing of the disc pack as the discs 106. The exaggerated inner radii of the spacers 136 have been provided merely to more clearly illustrate the selected shifting of the discs 106; in practice the spacers 136 will typically have inner radii that are nominally the same as the inner radii of the discs 106.

As discussed above, for disc packs with four or more discs, FIG. 2 illustrates the general manner in which a disc pack having an even number of discs can be advantageously oriented to achieve nominal static and dynamic balance. Such a disc pack with an odd number of discs can also achieve nominal static and dynamic balance by angularly offsetting the contact points of the discs around the spindle motor hub. Generally, the greater the number of discs, the less a contribution each disc makes to the total mass of the disc pack, making it easier to obtain a nominally balanced pack.

The methodology set forth by FIG. 2, however, does not generally achieve adequate balancing for a disc pack having a total of three discs. Angular offsets of 120 degrees can be used to achieve static balance in such a disc pack, but will not typically result in dynamic balance.

Figure 3:
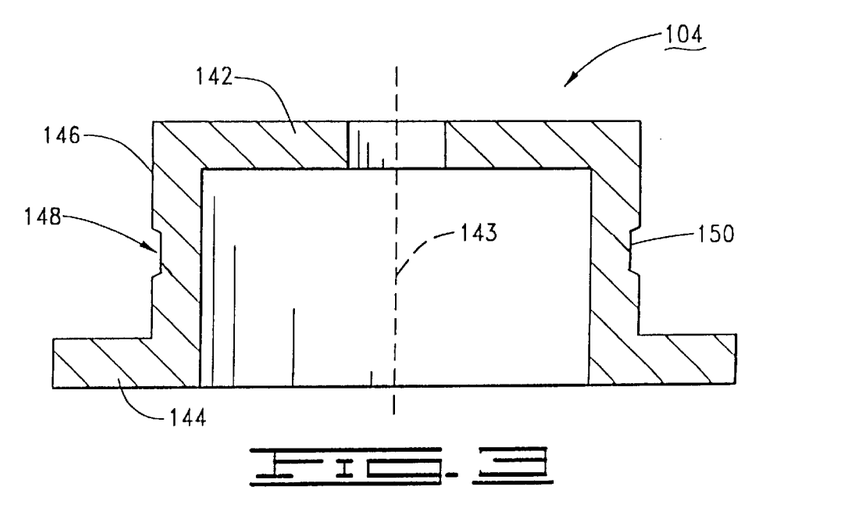
FIG. 3 is an elevational, cross-sectional view of a spindle motor hub constructed in accordance with preferred embodiments.

Accordingly, FIG. 3 has been provided to illustrate a spindle motor hub 142 which facilitates improved static and dynamic balance in a three-disc disc pack assembly. It will be recognized that the spindle motor hub 142 forms part of the spindle motor 104 of the disc drive of FIG. 1.

The spindle motor hub 142 is generally similar to the prior art spindle motor hub 132 of FIG. 2, in that the hub 142 rotates about a central axis 143 and includes a radially extending disc support flange 144. The spindle motor hub 142 also has a hub outer surface (denoted at 146) at a selected radius from the central axis 143, with this radius referred to hereinbelow as the "hub outer radius."

Additionally, however, the spindle motor hub 142 includes a centrally located, circumferentially extending groove 148 which preferably extends inwardly as shown from the hub outer surface 146. The groove 148 includes an inner surface 150 at a selected radius from the central axis 143, with this radius (referred to hereinbelow as the "groove radius") being less than the hub outer radius.

Figure 4:
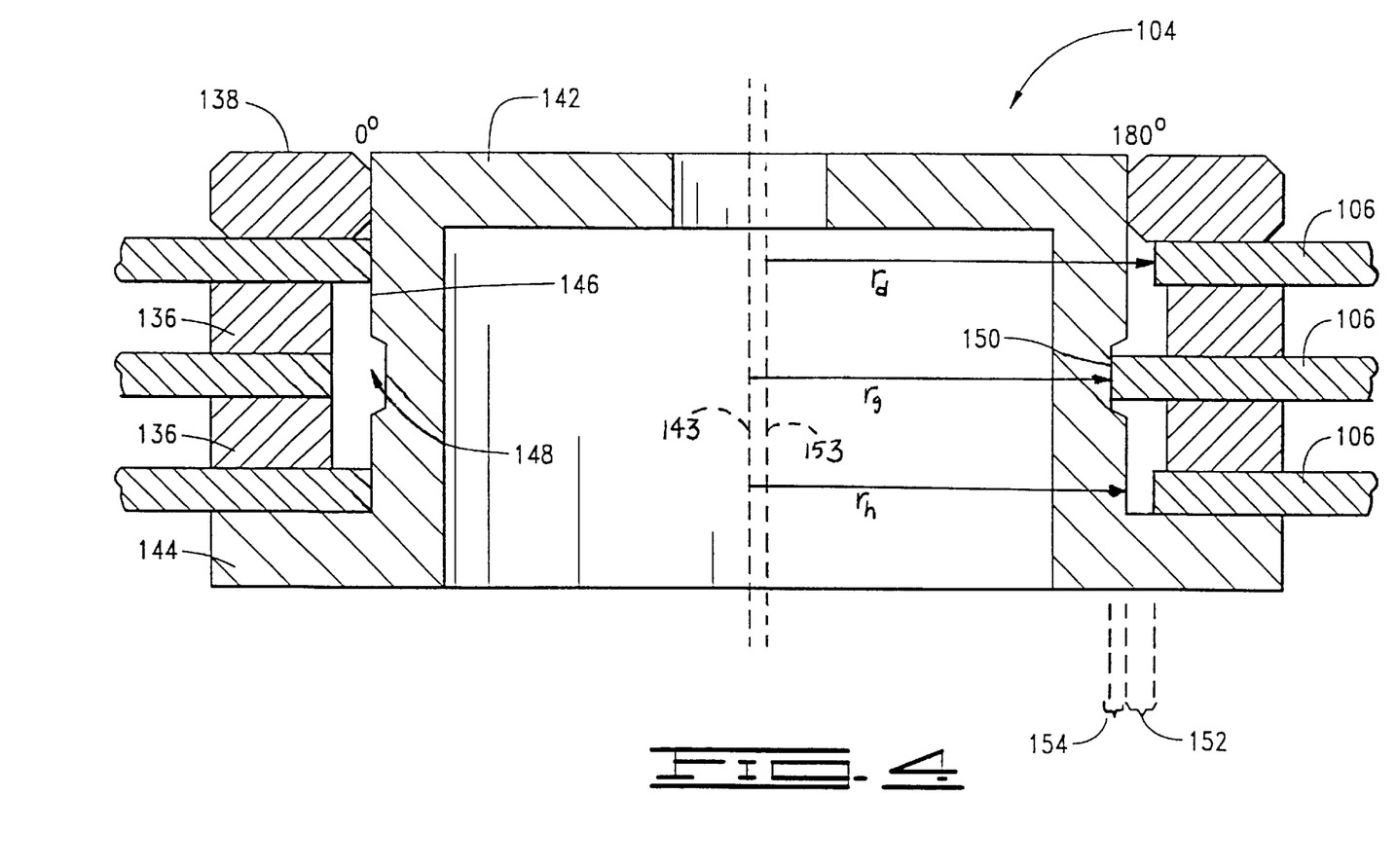
FIG. 4 shows an elevational, cross-sectional view of the spindle motor of the disc drive of FIG. 1 incorporating the spindle motor hub of FIG. 3.

The manner in which the spindle motor hub 142 is preferably utilized is set forth by FIG. 4, which shows an elevational, cross-sectional view of the spindle motor 104. As before, internal portions of the spindle motor 104 have been omitted for clarity. Similar components discussed in FIG. 2 are provided with identical reference numerals in FIG. 4.

A total of three discs 106 and two corresponding disc spacers 136 are clamped to the hub 142 by the disc clamp 138. The topmost and bottommost discs 106 (also referred to hereinbelow as "first" and "third" discs, respectively) are shifted to the right and abut the hub outer surface 146 at an angular location of 0 degrees. The intermediate disc 106 (also referred to hereinbelow as the "second" disc), however, is disposed within the groove 148 so as to abut the groove inner surface 150 at an angular position of 180 degrees.

To achieve nominal static and dynamic balance, the depth of the groove 148 is preferably selected to be equal to the difference between the hub outer radius and the disc inner radius. That is, if $r_d$ represents the disc inner radius, $r_h$ represents the hub outer radius, and $r_g$ represents the groove radius, then the following describes the preferred relationship between these various parameters:

$$r_d - r_h = r_h - r_g \quad (1)$$

Each of these radii are represented in FIG. 4. It will be noted that the top and bottom discs 106 will have a nominal center of mass that falls along axis 153, as both of these discs are shifted to the right. This results in a maximum displacement gap between the top and bottom discs 106 and the hub outer surface 146 as indicated by interval 152, which is nominally twice the depth of the groove 148, as indicated by interval 154. From equation (1), solving for $r_g$ yields:

$$r_g = 2r_h - r_d \quad (2)$$

Figure 5:
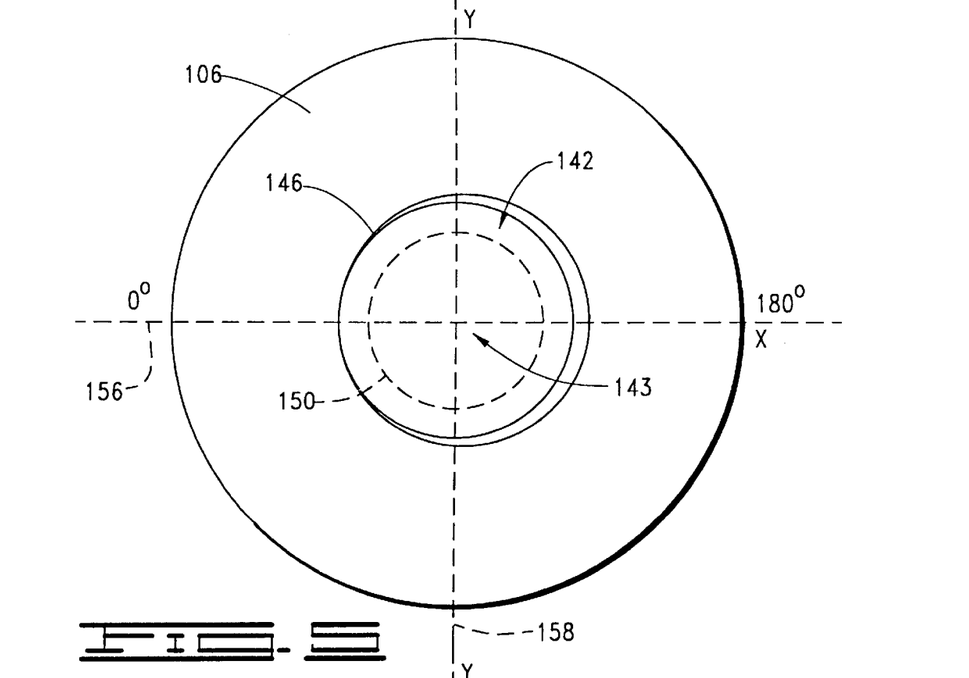
FIG. 5 provides a top plan representation of the spindle motor hub of FIG. 3, illustrating a preferred orientation of first and third discs of FIG. 4.
Figure 6:
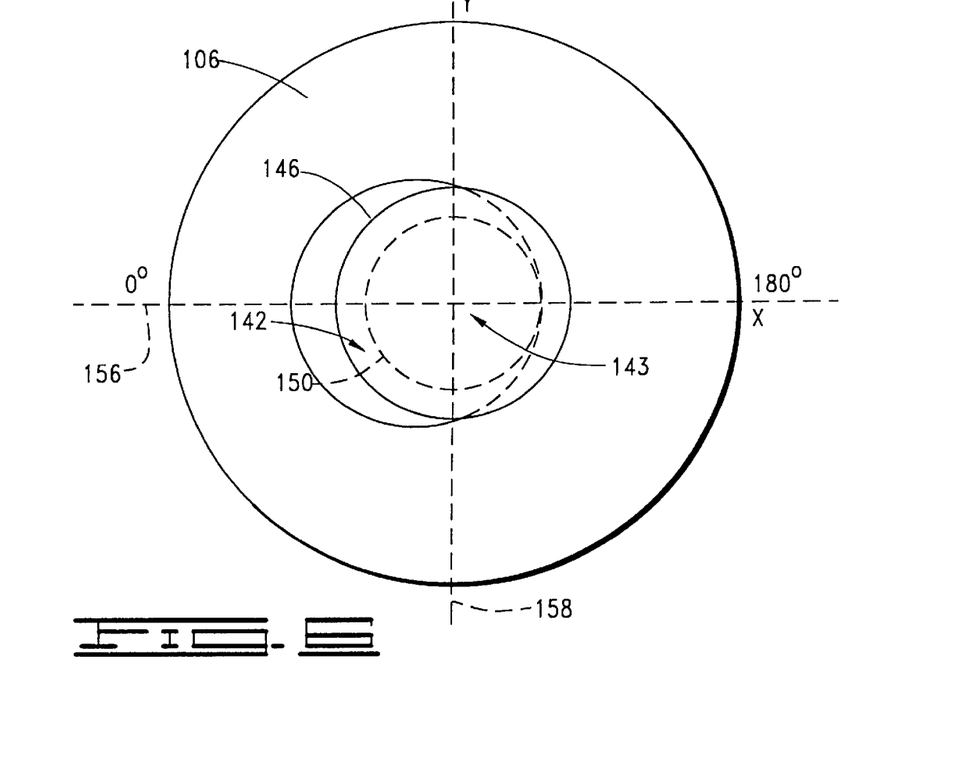
FIG. 6 provides a top plan representation of the spindle motor hub of FIG. 3, illustrating a preferred orientation of the second disc of FIG. 4.

The respective shifting of the discs 106 is illustrated by FIGS. 5 and 6, with FIG. 5 providing a representation of the general orientation of both the first and the third discs 106 with respect to the spindle motor hub 142, and FIG. 6 representing the general orientation of the second disc 106 with respect to the hub 142. It will be understood that the depth of the groove in FIG. 6 has been exaggerated for clarity. For convenience, x and y reference axes 156 and 158 have been plotted in FIGS. 5 and 6, with these axes lying along a plane parallel to the discs 106. The central axis 143 (FIG. 4) is normal to and intersects the axes 156 and 158, so that the central axis 143 extends in a z-direction out of the page.

The centers of mass for the discs represented in FIG. 5 are shifted along the x axis 156 in a direction to the right of the central axis 143, while the center of mass for the disc 106 shown in FIG. 6 is shifted along the x axis 156 in a direction to the left of the central axis 143. This results in the disc pack generally operating in accordance with the following relationship:

$$(2m)(d)=(m)(2d) \quad (3)$$

where m represents the mass of each of the individual discs and d represents the distance that the disc of FIG. 5 is shifted. In other words, static and dynamic balance are nominally achieved because shifting two discs a given distance in a first direction counters the effects of a single disc shifted twice the distance in the opposite direction. While centrally locating the groove 148 and forming the groove 148 to extend about the full circumference of the hub outer surface 146 compose a preferred embodiment, other locations and configurations for the groove can be readily selected as desired, depending upon the requirements of a given application.

Figure 7:
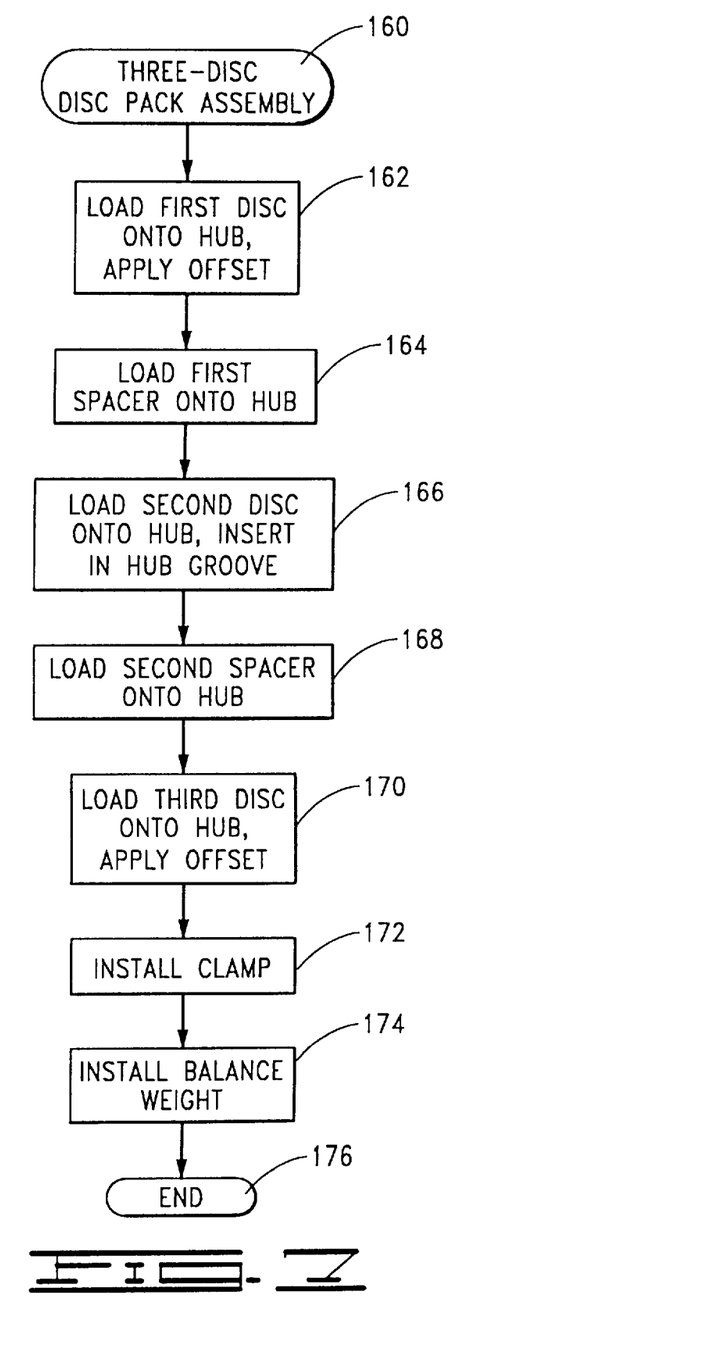
FIG. 7 is a flow chart for a THREE-DISC DISC PACK ASSEMBLY routine, representative of steps carried out to assemble the discs onto the spindle motor hub as shown in FIGS. 4–6 in accordance with preferred embodiments.

FIG. 7 provides a flow chart for a THREE-DISC DISC PACK ASSEMBLY routine 160, representative of steps carried out in accordance with preferred embodiments of the present invention to assemble the disc pack of FIG. 4. It will be recognized that the routine of FIG. 7 is preferably carried out as part of a high production, automated disc drive assembly process.

At step 162, the first disc 106 is loaded onto the spindle motor hub 142 and brought to rest upon the disc support flange 144. The first disc 106 is shifted laterally so as to bring the inner surface of the central opening in the first disc 106 into contact with the hub outer surface 146 at the desired angular location (such as 0 degrees, as shown in FIG. 5).

The first spacer 136 is next loaded onto the hub 132 and brought to rest upon the first disc 106, as shown by step 164. Next, during step 166 the second disc 106 is loaded onto the hub 142 and inserted into the groove 148 so as to bring the inner surface of the central opening of the second disc 106 into contact with the groove surface 150 at a position opposite the first disc 106 (such as at 180 degrees, as shown in FIG. 6).

The second spacer 136 is loaded onto the second disc 106 at step 168, after which during step 170 the third disc 106 is loaded and given the same offset as the first disc 106 (such as shown in FIG. 5). The disc pack is next clamped at step 172 and additional balancing operations are performed as desired at step 174, such as the measurement of the static and dynamic balance of the disc pack and the installation of one or more balance weights (such as a balance clip which affixes to the disc clamp 138, not shown), in accordance with conventional practices. The routine then ends at 176.

In view of the foregoing discussion, it will now be understood that the present invention is generally directed to an apparatus and method for reducing static and dynamic unbalance in a disc drive having a three-disc disc pack assembly.

In accordance with preferred embodiments, a disc drive spindle motor hub 142 is operably configured to rotate a set of three recording discs 106 about a central axis 143. The discs 106 are nominally identical, each having a central opening with a disc inner surface at a disc inner radius.

The hub 142 includes a hub outer surface 146 which circumferentially extends at a hub outer radius less than the disc inner radius. A groove 148 is formed in the hub 142 to provide a groove inner surface 150 which radially extends at a groove radius less than the hub outer radius. The groove radius is preferably selected to be twice the hub outer radius minus the disc inner radius.

To form a nominally statically and dynamically balanced disc pack assembly from the spindle motor hub 142 and the discs 106 (referred to as first, second and third discs, respectively), the first disc is loaded onto the spindle motor hub and shifted to bring the disc inner surface of the first disc into abutment with the hub outer surface at a first angular location (such as 0 degrees).

The second disc is next loaded onto the hub and shifted to bring the disc inner surface of the second disc into abutment with the groove inner surface at a second angular location (such as 180 degrees) opposite the first angular location. As with the first disc, the third disc is loaded onto the hub and shifted to bring the disc inner surface of the third disc into abutment with the hub outer surface at the first angular location (such as 0 degrees). Disc spacers 136 are preferably loaded to provide inter-disc spacing between adjacent discs, and a disc clamp 138 secures the discs to the hub in the desired configuration.

Static and dynamic balance are nominally achieved because shifting two discs a given distance in a first direction counters the effects of a single disc shifted twice the distance in the opposite direction.

For purposes of the appended claims, the phrase "angular location" will be clearly understood in accordance with the foregoing discussion to describe a rotational position with respect to a defined axis, such as the angular locations of 0 and 180 degrees discussed above and represented in FIGS. 4–6. Terms such as "radial" and "radially" will be understood as describing a point or surface at a selected radius from a defined axis, such as the groove inner surface 150 which extends radially about the central axis 143 (as shown in FIG. 3). Steps in method claims have been presented in a particular order, but the scope of such claims will not necessarily be limited to the order shown. It will be apparent that utilizing the claimed invention to accommodate multiple sets of three discs on the same spindle motor hub is well within the ability of those skilled in the art and accordingly is contemplated as readily falling within the spirit and scope of the claimed invention.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A spindle motor hub operably configured to rotate a set of three recording discs about a central axis, the discs characterized as first, second and third discs and each having a central opening with a disc inner surface at a disc inner radius, the spindle motor hub comprising:

a hub outer surface circumferentially extending at a hub outer radius less than the disc inner radius and operably configured to abut the disc inner surfaces of the first and third discs at a first angular location; and a groove inner surface, adjacent the hub outer surface, radially extending at a groove radius less than the hub outer radius and operably configured to abut the disc inner surface of the second disc at a second angular location opposite the first angular location.

2. The spindle motor hub of claim 1, wherein the groove radius is nominally equal to two times the hub outer radius minus the disc inner radius to reduce static and dynamic unbalance in a disc pack assembly formed from the spindle motor hub and the discs.

3. The spindle motor hub of claim 1, wherein the groove is centrally located so that the hub outer surface is divided into two portions and the groove inner surface is disposed between the two portions.

4. The spindle motor hub of claim 1, further comprising a disc support flange which circumferentially extends from the hub outer surface to support the discs when mounted to the spindle motor hub.

5. A disc drive, comprising:

a rotatable spindle motor hub comprising a hub outer surface which circumferentially extends about the central axis at a hub outer radius, and a radially extending groove comprising a groove inner surface at a groove radius less than the hub outer radius;

first, second and third recording discs each comprising a central opening with a disc inner surface at a disc inner radius greater than the hub outer radius, wherein the discs are mounted to the rotatable spindle motor hub with the first and third discs shifted with respect to the central axis so that the respective disc inner surfaces of the first and third discs are brought proximate the hub outer surface at a first angular location, and wherein the second disc is placed within the groove and shifted with respect to the central axis so that the disc inner surface of the second disc is brought proximate the groove inner surface at a second selected angular location opposite the first angular location.

6. The disc drive of claim 5, wherein the groove radius is nominally equal to two times the hub outer radius minus the disc inner radius to reduce static and dynamic unbalance in the disc pack assembly.

7. The disc drive of claim 5, wherein the groove is centrally located in the hub outer surface so that the second disc is disposed between the first and third discs.

8. A method for reducing static and dynamic unbalance in a disc pack assembly of a disc drive having a set of three discs characterized as first, second and third discs and each having a central opening with a disc inner surface at a disc inner radius, the method comprising steps of:

(a) providing a spindle motor hub having a hub outer surface at a hub outer radius less than the disc inner radius and a groove inner surface at a groove radius less than the hub outer radius;

(b) loading the first disc onto the spindle motor hub to bring the disc inner surface of the first disc into abutment with the hub outer surface at a first angular location;

(c) loading the second disc onto the spindle motor hub to bring the disc inner surface of the second disc into abutment with the groove inner surface at a second angular location opposite the first angular location; and (d) loading the third disc onto the spindle motor hub to bring the disc inner surface of the third disc into abutment with the hub outer surface at the first angular location.

9. The method of claim 8, wherein the providing step (a) comprises a step of selecting the groove radius as nominally two times the hub outer radius minus the disc inner radius.

10. The method of claim 8, wherein disc spacers are loaded onto the spindle motor hub to establish inter-disc spacing between adjacent pairs of the first, second and third discs.

* * * * *